Feb. 9, 1965     W. J. CHMIEL     3,169,033
HANDLING TOOL
Filed Feb. 25, 1963     2 Sheets-Sheet 1
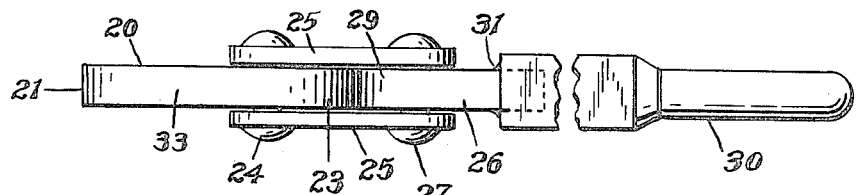
FIG. 1.
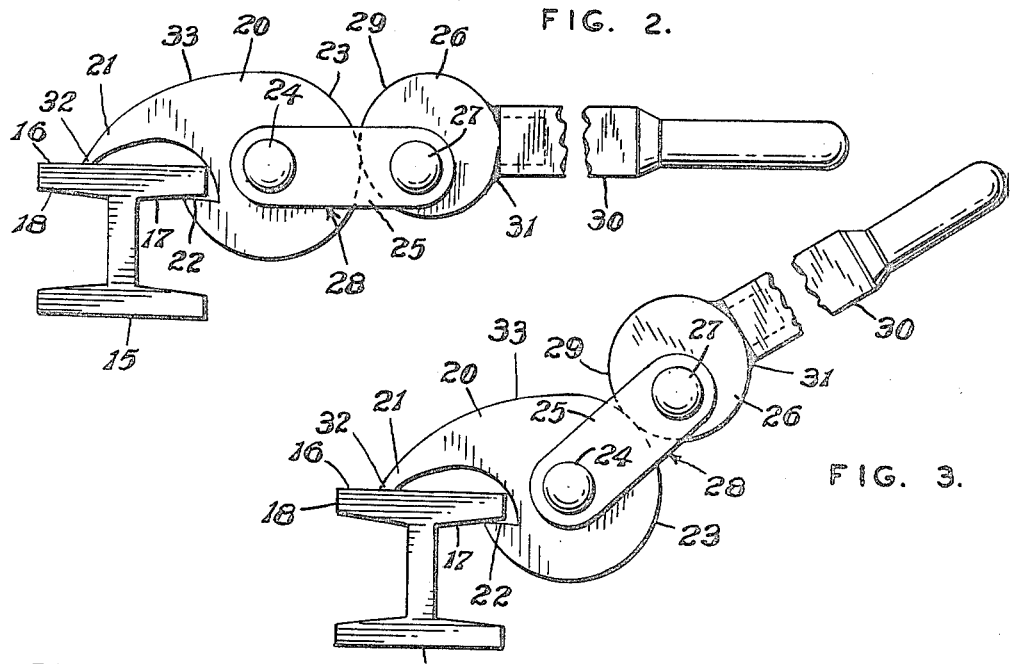
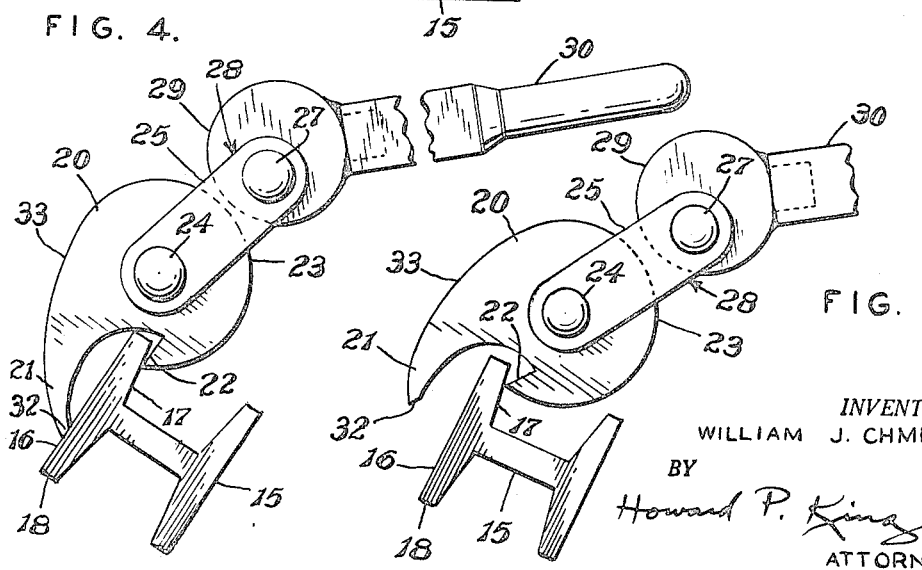
INVENTOR.
WILLIAM J. CHMIEL
BY
Howard P. King
ATTORNEY

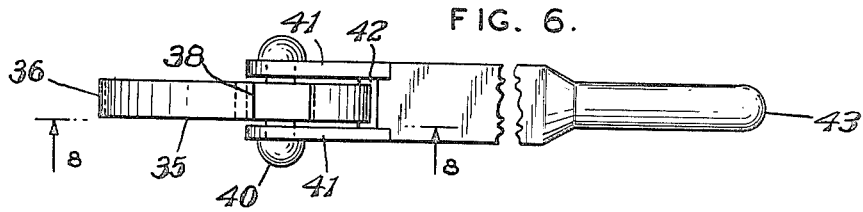
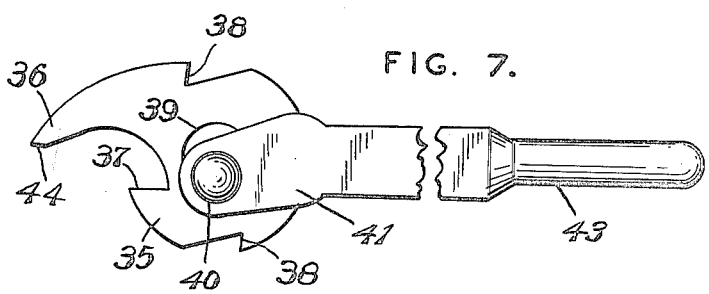
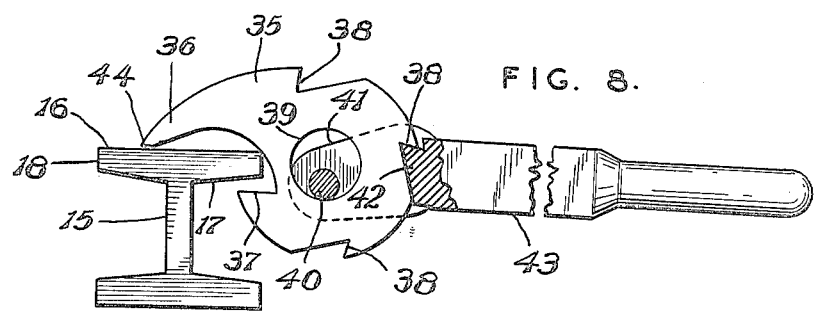
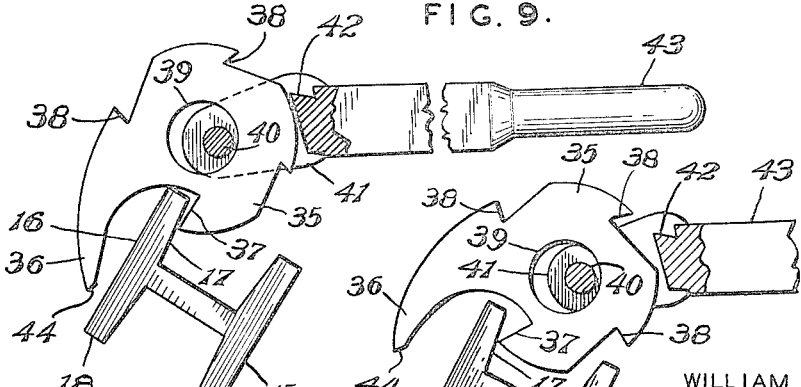
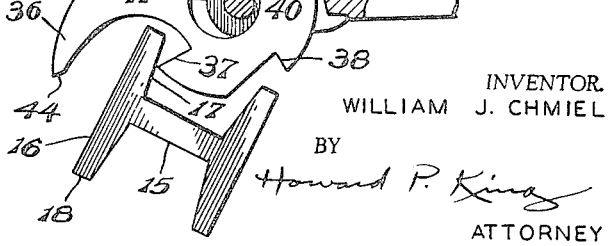

United States Patent Office 3,169,033
Patented Feb. 9, 1965

3,169,033
HANDLING TOOL
William J. Chmiel, 511 W. 232nd St., New York, N.Y.
Filed Feb. 25, 1963, Ser. No. 260,766
3 Claims. (Cl. 294—15)

This invention relates to an improved handling tool for rails, structural steel and the like, and has a place in the steel industry comparative to that which cant hooks and peaveys have in the lumbering industry.

Heretofore turning, prying and general handling of structural steel, rails and the like has been generally effected, in addition to direct grasping by hand, by use of such tools and devices as pinch-bars, crow-bars, dolly-bars, spud wrenches, wood staves and the like which involve danger to the user, inadequacy of operation, insufficient leverage, laborious handling and other incompetencies and deficiencies.

In its broad aspect, therefore, the invention proposes a structure to overcome the foregoing difficulties with less hazard and greater efficiency.

Also of general nature, the invention provides a tool of versatile character capable of lifting, turning, prying and general handling of rails and structural steel, plates, and the like of various shapes, and to do so safely.

The invention supplies a universality of use in plants producing the steel shapes, for handlers, truckers, erectors, and others having a necessity of prying, lifting, moving, turning, compacting, separating, or otherwise manipulating such work-pieces.

More specifically, the invention has an essential objective of providing a tool which will not pitch the user under impetus of gravitation of the article being manipulated to its shifted position.

Likewise of important character, is the object of providing a tool which will automatically disengage the work-piece being manipulated, but with the user retaining hold on the tool safely and without extra exertion.

In detail, the invention incorporates a combination of a two-lip spiral hook, constituting a jaw, with a clevis, an actuator and a handle, as a unitary assembly providing a tool having the benefits indicated above and overcoming the inadequacies of tools heretofore used in the trade.

Referring to the accompanying drawings, in which like numerals of reference indicate similar parts throughout the several views;

FIGURE 1 is a top edge view of a tool embodying the present invention;

FIGURE 2 is a side elevation of the tool of FIG. 1, showing the same in gripping engagement with an I-beam and with the tool handle selectively positioned approximately horizontally;

FIGURE 3 is a similar side elevation of the tool showing it again in gripping engagement with an I-beam but with the handle selectively positioned at an angle from the horizontal;

FIGURE 4 is still another side elevation of the tool and this time showing it in operation tilting the I-beam which is just beginning to gravitate to turned position;

FIGURE 5 is a further side elevation of the tool showing it releasing from the I-beam as said I-beam gravitates decisively toward its turned position;

FIGURE 6 is a top edge view corresponding to FIG. 1, showing a modified construction of tool;

FIGURE 7 is a side elevation of the modified construction of FIG. 6;

FIGURE 8 is an elevational section on line 8—8 of FIG. 6; and

FIGURES 9 and 10 are side elevations showing different conditions of release of the tool from the work-piece as the work-piece gravitates toward its turned position.

The invention as exemplified by the two selected showings thereof in the drawings, in each instance provides a jaw having a long lip and a short lip at what will be herein termed the front of the jaw and provides an arcuate periphery at what will be termed the rear of the jaw. Said lips are adapted to grasp the work-piece therebetween, and said periphery is adapted to be engaged by and be disengaged from a jaw-actuator constituting part of the tool and located proximate to and in opposition to said periphery of the jaw. The arms of a clevis project forwardly from said actuator on opposite sides of the jaw, maintaining the assembly operatively associated. Projecting rearwardly from said actuator, that is, in a direction away from the jaw and clevis, is a handle by which the operator applies leverage to the jaw through the intervening agencies of the actuator and clevis.

The tool may be used on any one of a great variety of work-pieces, such as rails, I-beams, T-bars, Z-bars, channel irons, flat bars and sheets, and other forms too numerous to list herein. For purposes of this disclosure, but without restriction thereto, the work-piece has been arbitrarily selected as an I-beam 15, which represents the general characteristics encountered in the trade by providing oppositely facing surfaces available to the tool at a common side or edge of the work-piece, and which, for purposes of this description, may be designated upper face 16 and under shoulder 17 of a flange 18 of I-beam 15.

Devoting attention now to the specific embodiment of the invention illustrated on Sheet 1 of the drawings, the reference numeral 20 designates the tool jaw which provides a forwardly projecting long lip 21 beneath which is a short lip 22 wherein the center of curvature of the under edge of the long lip is forwardly of the front end of the short lip. Thus the under edge of the long lip 21 spirals away from the front end of the short lip as a result of which, when the front end of the short lip engages and acts as a fulcrum against a work-piece, said work-piece progressively rotates away from said under edge of the long lip, thereby avoiding any frictional or other hindering or retaining effect on the work-piece by said under edge of the long lip, as will be appreciated by a comparison of FIGURES 4 and 5.

In this embodiment of the invention, the rear arcuate peripheral edge 23 of jaw 20 is a segment of a cylinder at the center of curvature of which is an axial pin 24 constituting a pivotal mounting for the forward end portions of clevis arms 25 disposed in parallelism to each other on opposite sides of said jaw and projecting rearwardly beyond said arcuate edge 23 of the jaw and overlapping opposite sides of a jaw actuator 26. Another pivot pin 27 projects through rear portions of said arms 25 and through said actuator. Both of the pivot pins 24 and 27 are provided with heads at both ends thereof for maintaining the arms assembled in flatwise pivotal juxtaposition to the respective sides of the jaw and actuator and maintaining edge portions of the jaw and actuator always addressed toward each other. Said arms and pins together constitute a clevis 28.

The peripheral edge surface 29 of the actuator is of arcuate character progressively varying in radial distance from the axis of the rear clevis pin 27, and as an example of convenient manufacture, said peripheral edge surface 29 may be cylindrical but eccentric to the pin axis. This enables the clevis 28 to be swung to any desired pivotal location on the jaw 20 while a short radius portion of the eccentric is toward the jaw, and then by partial rotation of said actuator 26 a longer radius portion of the eccentric periphery may be brought into tight engagement with the arcuate periphery of the jaw and lock against the same. This arrangement therefore provides for locking engagement of the actuator 26 at a multiplicity of positions along the arcuate edge 23 on the jaw 20.

A handle or lever 30 projects in a generally radial direction from said actuator 26 and is made fast with respect thereto in any suitable manner, here indicated as by welding at 31. This handle will be effective to supply the necessary leverage to the work-piece when said handle is operated to first bring the eccentric outer periphery of the actuator 26 into contact with the arcuate periphery 23 of the jaw 20, whereupon tension is developed in the clevis 28 immobilizing the jaw with respect to the actuator and rendering the handle, actuator, clevis and jaw a rigid unity as long as forward pressure is applied to the handle and resistance to such pressure is encountered by the jaw from the work-piece. As soon, however, as resistance offered by the work-piece is released, as when the work-piece begins to gravitate of its own volition in the direction in which it is being moved by the jaw, the jaw and clevis inaugurate a more pronounced rotation than impelled by the actuator 26 and handle 30, releasing the tension in the clevis 28 and promoting movement of the periphery 23 of the jaw 20 to a shorter radius area of the periphery 29 of eccentric actuator 26. Consequently the handle 30 is not yanked forwardly and avoids pulling the operator forwardly or throwing him toward the gravitating work-piece. Stages of release of the jaw 20 from the work-piece 15 and from the actuator 26 are shown in FIGURES 4 and 5.

It may be here noted that the tool is also capable of prying under a work-piece, in that the long lip 21 of the jaw 20 is provided with a chisel edge 32 at its forward end. Ordinarily when used as a pry, the tool is turned over so that the spiral hollow of the jaw is directed upwardly, and what is shown as the arcuate upper edge 33 of the jaw in the drawings then becomes a rocker-fulcrum for prying purposes.

Attention may now be directed to the modified construction illustrated on Sheet 2 of the drawings, where it will be observed the general organization above described is again present but with some differences of detail character. For greater clarity, different reference numerals are employed in most instances although the terminology remains the same.

In this showing, a jaw 35 with a long upper lip 36 and short lower lip 37 as before, is provided, but the rear arcuate edge of this jaw is provided with a plurality of ratchet-like notches 38. Coaxial with the arcuate rear edge of the jaw there is a round hole 39 the diameter whereof is considerably greater than the diameter of a clevis pin 40 passing therethrough. Opposite end portions of said pin pass through clevis arms 41 and are headed at the outer sides of each thereby maintaining the pin in place. The clevis arms 41 project beyond the periphery of and at the rear of the jaw 35 and are made integral with a pawl-like actuator 42 which in turn is made integral with and at the forward end of a handle or lever 43.

By virtue of the greater size of the hole 39 through which clevis pin 40 passes than the size of said pin, an eccentricity is introduced permitting the pawl-like actuator 42 to enter and be engaged in a selected one of the notches 38 and obtains rigid cooperation of actuator 42, clevis arms 41 and jaw 35 upon applying forwardly swinging pressure on handle 43 against resistance supplied by engagement of lips 36, 37 of the jaw with the work-piece 15. Release of that resistance, as with the previously described embodiment, permits forward rotation of the jaw and disassociation thereof from the work-piece following pivoting of the front end of the short lip 37 against said work-piece. The gravitational movement of the work-piece therefore occurs as in the previously described construction without dragging the clevis, actuator and handle with it, thus avoiding jerking the arms of the operator and exerting no force tending to yank him forwardly. It will be apparent from FIGURES 9 and 10, that the long lip 36 has a spiral curvature away from the short lip on a center forwardly of the front edge of the short lip 37 and therefore is not in the way of the gravitating work-piece. It also may be mentioned that the forward end of the long lip 36 is terminated with a chisel edge 44.

I claim:
1. A tool of the character described, comprising a rotatable jaw having at one side thereof two opposed lips of which one is longer than the other and each having forward and rear ends, said lips adapted to receive a part of a work-piece therebetween and apply turning force to said work-piece, said longer lip providing a concave spiral surface toward the shorter lip with said spiral surface extending to and intersecting the shorter lip and constituting the rear end thereof, a handle, a clevis connecting said handle and jaw and with the jaw rotatable in the clevis, an actuator located at and opposed to an edge of said jaw at a side thereof away from said lips and fixed on said handle and at least in part within said clevis, said actuator being engageable with said jaw edge for applying rotative actuation in one direction only to said jaw in turning a work-piece, and said actuator being inherently releasable of its own volition from contact with said edge when rate of rotation of the jaw exceeds rate of movement of said actuator, and the forward end of said short lip adapted to function as a fulcrum against the work-piece and cause said spiral surface of said longer lip to swing away from said work-piece when the rate of rotation of the work-piece exceeds rate of rotation of said jaw, whereby double release from impelling backlash rotation by the work-piece upon the handle is afforded.

2. A tool in accordance with claim 1, wherein said spiral in approach of said surface to its intersection with the rear end of the shorter lip has a radius longer than said short lip and centered forwardly beyond the forward end of said shorter lip whereby as the jaw turns on said fulcrum said spiral surface describes an orbit progressively increasing the space between it and the work-piece and unfailingly releasing grip of the jaw from said work-piece.

3. A tool in accordance with claim 1, wherein said jaw and actuator have mutually engageable edge surfaces which slope away from each other in direction of rotative release of the actuator and jaw from each other, thereby requiring automatic release of the jaw from the actuator whenever the jaw rotation tends to exceed the actuator rotation in direction impelled by the handle in turning the work-piece.

References Cited by the Examiner
UNITED STATES PATENTS
1,657,100  1/28  Wilson et al. _____ 294—15

FOREIGN PATENTS
415,906   8/25   Germany.
494,966  11/38   Great Britain.
497,995  12/53   Canada.

SAMUEL F. COLEMAN, *Acting Primary Examiner.*
ANDRES H. NIELSEN, *Examiner.*